United States Patent
Xiong

(10) Patent No.: US 9,547,111 B2
(45) Date of Patent: Jan. 17, 2017

(54) MANUFACTURING METHOD OF POLARIZED LIGHT MODULATION DEVICE

(71) Applicant: Shenzhen China Star Optoelectronics Technology Co., Ltd., Shenzhen, Guangdong (CN)

(72) Inventor: Yuan Xiong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 307 days.

(21) Appl. No.: 14/385,999

(22) PCT Filed: Sep. 2, 2014

(86) PCT No.: PCT/CN2014/085773
§ 371 (c)(1),
(2) Date: Sep. 17, 2014

(87) PCT Pub. No.: WO2016/026166
PCT Pub. Date: Feb. 25, 2016

(65) Prior Publication Data
US 2016/0238763 A1    Aug. 18, 2016

(30) Foreign Application Priority Data
Aug. 21, 2014 (CN) .......................... 2014 1 0416412

(51) Int. Cl.
*G02F 1/1337* (2006.01)
*G02B 5/30* (2006.01)
(Continued)

(52) U.S. Cl.
CPC .......... *G02B 5/30* (2013.01); *G02B 5/305* (2013.01); *G02F 1/1333* (2013.01); *G02F 1/1334* (2013.01); *G02F 1/1337* (2013.01); *G02F 1/1341* (2013.01); *G02F 1/13439* (2013.01); *G02F 1/133753* (2013.01); *G02F 1/133788* (2013.01); *G02F 2001/133302* (2013.01); *G02F 2001/133757* (2013.01)

(58) Field of Classification Search
CPC ................................................ G02F 1/133788
See application file for complete search history.

(56) References Cited

U.S. PATENT DOCUMENTS

2013/0148065 A1*  6/2013  Peng ................ G02F 1/134309
                                                      349/123

* cited by examiner

*Primary Examiner* — Phu Vu
(74) *Attorney, Agent, or Firm* — Andrew C. Cheng

(57) ABSTRACT

A polarized light modulation device and a manufacturing method thereof are provided. Oppositely disposed first and second transparent electrode substrates are provided. Polymerizable monomers and cholesteric liquid crystals are filled between the first and second substrates. Different operating voltages are applied between the first and second substrates by at least two times to change a helical pitch of the cholesteric liquid crystals. Light irradiation passing through the first or second substrate is performed on the polymerizable monomers in one of different domains after each time of applying one of the operating voltages to solidify the changed helical pitch of the cholesteric liquid crystals. Solidified helical pitches of the cholesteric liquid crystals in the different domains are different. A recovery voltage is applied between the first and second substrates to retrieve an optical rotatory property of the cholesteric liquid crystals back to the state of solidifying.

10 Claims, 1 Drawing Sheet

(51) Int. Cl.
*G02F 1/1333* (2006.01)
*G02F 1/1334* (2006.01)
*G02F 1/1341* (2006.01)
*G02F 1/1343* (2006.01)

MANUFACTURING METHOD OF POLARIZED LIGHT MODULATION DEVICE

TECHNICAL FIELD

The present invention relates to the field of liquid crystal display technology, and particularly to a polarized light modulation device and a manufacturing method thereof.

DESCRIPTION OF RELATED ART

Light alignment technique is to use linearly polarized ultraviolet light to perform a light alignment processing (i.e., exposure) on an alignment material at an alignment layer surface, so as to cause polymer side chains of the alignment material at the alignment layer surface under the polarized light to take place reactions such as polymerization, decomposition and isomerization, and to thereby achieve the alignment of liquid crystal molecules.

In order to increase the viewing angle of a liquid crystal panel, each pixel generally is divided into multiple liquid crystal alignment domains, and liquid crystal molecules in the respective liquid crystal alignment domains have different pretilt angles. In the prior art, in order to make the liquid crystal molecules in the respective liquid crystal alignment domains to be with different pretilt angles, it is necessary to perform exposure on the respective liquid crystal alignment domains by different polarized lights, i.e., multiple times of exposure are needed to complete the light alignments of the multiple liquid crystal alignment domains. However, the conventional process is complex and not easy to control, the process time is long, and the production efficiency is not high.

SUMMARY

Accordingly, a technical problem to be primarily solved by the present invention is to provide a polarized light modulation device and a manufacturing method thereof, so as to reduce the number of exposure in the light alignment process, shorten the process time and thereby simplify the process.

In order to solve the above technical problem, a technical solution proposed by the present invention is to provide a manufacturing method of a polarized light modulation device. The manufacturing method includes:

providing oppositely disposed a first transparent electrode substrate and a second transparent electrode substrate;

filling polymerizable monomers and cholesteric liquid crystals between the first transparent electrode substrate and the second transparent electrode substrate;

adding a photoinitiator or a photosensitizer between the first transparent electrode substrate and the second transparent electrode substrate;

applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains to be different from each other;

applying a recovery voltage between the first transparent electrode substrate and the second transparent electrode substrate to retrieve an optical rotatory property of the cholesteric liquid crystals back to the state of solidifying;

wherein when performing the light irradiation passing through the first transparent electrode substrate or the second transparent electrode substrate on the polymerizable monomers in the corresponding one of the different domains after each time of applying one of the different operating voltages, the other of the different domains without the need of light irradiation is shielded from the light irradiation In an exemplary embodiment, the step of applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains to be different from each other includes:

applying a first operating voltage between the first transparent electrode substrate and the second transparent electrode substrate to change the helical pitch of the cholesteric liquid crystals to be a first helical pitch;

performing a first time light irradiation passing through the first transparent electrode substrate or the second transparent electrode substrate on the polymerizable monomers in a first domain to make a solidified helical pitch of the cholesteric liquid crystals in the first domain to be the first helical pitch;

applying a second operating voltage between the first transparent electrode substrate and the second transparent electrode substrate to change the helical pitch of the cholesteric liquid crystals to be a second helical pitch, wherein the second helical pitch is not equal to the first helical pitch;

performing a second time light irradiation passing through the first transparent electrode substrate or the second transparent electrode substrate on the polymerizable monomers in a second domain to make a solidified helical pitch of the cholesteric liquid crystals in the second domain to be the second helical pitch, wherein the second domain is different from the first domain, the second operating voltage is different from the first operating voltage, and the second helical pitch is different from the first helical pitch.

In an exemplary embodiment, the first transparent electrode substrate and the second transparent electrode substrate each include a glass substrate and a transparent electrode disposed on the glass substrate.

In an exemplary embodiment, the operating voltages are direct current (DC) voltages, and the recovery voltage is an alternating current (AC) voltage.

In an exemplary embodiment, the operating voltages are alternating current voltages, the recovery voltage is an alternating current voltage, and a frequency of the recovery voltage is higher than a frequency of each of the operating voltages.

In an exemplary embodiment, a light source used for the light irradiation is ultraviolet light.

In order to solve the above technical problem, another technical solution proposed by the present invention is to provide a polarized light modulation device. The polarized light modulation device includes: a first transparent electrode substrate, a second transparent electrode substrate and a polymer dispersed cholesteric liquid crystal layer filled between the first transparent electrode substrate and the second transparent electrode substrate; the polarized light modulation device being divided into at least two domains by the first transparent electrode substrate or the second transparent electrode substrate, and solidified helical pitches of cholesteric liquid crystals in the at least two domains respectively being different from each other;

wherein the polymer dispersed cholesteric liquid crystal layer filled between the first transparent electrode substrate and the second transparent electrode substrate is formed by: filling polymerizable monomers and cholesteric liquid crystal between the first transparent electrode substrate and the second transparent electrode substrate, applying different operating voltages between the first transparent electrode substrate and the second transparent electrode substrate by at least two times to change a helical pitch of the cholesteric liquid crystals, and performing light irradiation passing through the first transparent electrode substrate or the second transparent electrode substrate on the polymerizable monomers in a corresponding one of different domains after each time of applying one of the different operating voltages to solidify the changed helical pitches of the cholesteric liquid crystals;

wherein the first transparent electrode substrate and the second transparent electrode substrate further have a photoinitiator or a photosensitizer added therebetween.

In an exemplary embodiment, the first transparent electrode substrate and the second transparent electrode substrate each include a glass substrate and a transparent electrode formed on the glass substrate.

In order to solve the above technical problem, still another technical solution proposed by the present invention is to provide a manufacturing method of a polarized light modulation device. The manufacturing method includes:

providing oppositely disposed a first transparent electrode substrate and a second transparent electrode substrate;

filling polymerizable monomers and cholesteric liquid crystals between the first transparent electrode substrate and the second transparent electrode substrate;

applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains to be different from each other;

applying a recovery voltage between the first transparent electrode substrate and the second transparent electrode substrate to retrieve an optical rotatory property of the cholesteric liquid crystals back to the state of solidifying.

In an exemplary embodiment, the step of applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains be different from each other includes:

applying a first operating voltage between the first transparent electrode substrate and the second transparent electrode substrate to change the helical pitch of the cholesteric liquid crystals to be a first helical pitch;

performing a first time light irradiation passing through the first transparent electrode substrate or the second transparent electrode substrate on the polymerizable monomers in a first domain to make a solidified helical pitch of the cholesteric liquid crystals in the first domain to be the first helical pitch;

applying a second operating voltage between the first transparent electrode substrate and the second transparent electrode substrate to change the helical pitch of the cholesteric liquid crystals to be a second helical pitch, wherein the second helical pitch is not equal to the first helical pitch;

performing a second time light irradiation passing through the first transparent electrode substrate or the second transparent electrode substrate on the polymerizable monomers in a second domain to make a solidified helical pitch of the cholesteric liquid crystals in the second domain to be the second helical pitch, wherein the second domain is different from the first domain, the second operating voltage is different from the first operating voltage, and the second helical pitch is different from the first helical pitch.

In an exemplary embodiment, when performing the light irradiation passing through the first transparent electrode substrate or the second transparent electrode substrate on the polymerizable monomers in the corresponding one of the different domains after each time of applying one of the different operating voltages, the other of the different domains without the need of light irradiation is shielded from the light irradiation.

In an exemplary embodiment, before applying different operating voltages between the first transparent electrode substrate and the second transparent electrode substrate by at least two times, further including: adding a photoinitiator or a photosensitizer between the first transparent electrode substrate and the second transparent electrode substrate.

In an exemplary embodiment, the first transparent electrode substrate and the second transparent electrode substrate each include a glass substrate and a transparent electrode disposed on the glass substrate.

In an exemplary embodiment, the operating voltages are direct current voltages, and the recovery voltage is an alternating current voltage.

In an exemplary embodiment, the operating voltages are alternating current voltages, the recovery voltage is an alternating current voltage, and a frequency of the recovery voltage is higher than a frequency of each of the operating voltages.

In an exemplary embodiment, a light source used for the light irradiation is ultraviolet light.

Beneficial effects can be achieved by the present invention are that: compared with the prior art, the present invention fills polymerizable monomers and cholesteric liquid crystals between the first transparent electrode substrate and the second transparent electrode substrate, applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains to be different from each other. Due to the orientation vector of the cholesteric liquid crystals periodically rotates according to a certain solidified helical pitch, polarization states of emitting lights corresponding to the different solidified helical pitches are different from each other. Moreover, since the polarized light modulation device of the present invention has different domains with at least two different solidified helical pitches, after a same polarized light incident into the polarized light modulation device, the emitting lights corresponding to the different domains would have different polarization states, when the emitting polarized lights with these different polarization states are introduced to be incident into an alignment layer surface of a liquid crystal panel, the alignment processing on liquid crystal modules in the liquid crystal panel would be completed. That is, by using the polarized light modulation device of the present invention, only one time exposure is required to complete the alignment of the liquid crystal molecules. As a result, the process is simplified, the process time is shortened and the production efficiency is improved.

In order to further understand the features and technical contents of the present invention, please refer to the following detailed description and accompanying drawings of the present invention. However, the drawings are provided for the purpose of illustration and description only, and are not intended to limit the present invention.

BRIEF DESCRIPTION OF THE DRAWINGS

Embodiments of the present invention will be described below in detail with reference to the drawings, and thereby the technical solutions of the present invention and other beneficial effects will be more apparent. In the drawings.

DETAILED DESCRIPTION OF EMBODIMENTS

In the following, with reference to accompanying drawings of embodiments of the present invention, technical solutions in the embodiments of the present invention will be clearly and completely described. Apparently, the embodiments of the present invention described below only are a part of embodiments of the present invention, but not all embodiments. Based on the described embodiments of the present invention, all other embodiments obtained by ordinary skill in the art without creative effort belong to the scope of protection of the present invention.

Figure 1:
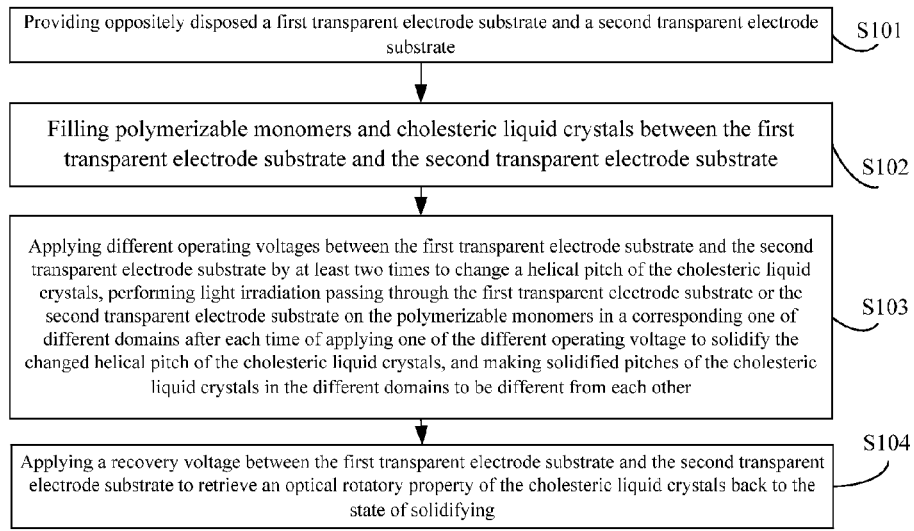
FIG. 1 is a flowchart of an exemplary embodiment of a manufacturing method of a polarized light modulation device according to the present invention.

Referring to FIG. 1, an exemplary embodiment of the present invention provides a manufacturing method of a polarized light modulation device. The manufacturing method includes the following steps S101, S102, S103 and S104, detailed description of the steps S101~S104 will be made below.

Step S101: providing oppositely disposed a first transparent electrode substrate and a second transparent electrode substrate.

"Oppositely disposed" means that the first transparent electrode substrate and the second transparent electrode are disposed in parallel, the first transparent electrode substrate and the second transparent electrode substrate both allow light passing therethrough, and opposite inner sides/surfaces of the first and second transparent electrode substrates respectively are formed with electrodes.

Step S102: filling polymerizable monomers and cholesteric liquid crystals between the first transparent electrode substrate and the second transparent electrode substrate.

The polymerizable monomers can take place polymerization reaction induced by light irradiation to form a polymer with network structure. In this embodiment, an active functional group of the polymerizable monomers may be an acryloyl group, a methacryloyl group, a vinyl group, a styryl group or an epoxy group, and so on. Liquid crystal molecules of the cholesteric liquid crystals are arranged in parallel in a plane, the liquid crystal molecules in neighboring planes have a slight change in orientation, the liquid crystal molecules helically change along a normal direction of the plane and a distance of undergoing a 360-degree change in orientation direction is termed as helical pitch. When the polymerizable monomers are polymerized to be a polymer, the network structure of the polymer fixes the liquid crystal molecules located therein so that the fixed liquid crystal molecules do not rotate any more. The polymerizable monomers and cholesteric liquid crystals are mutually uniformly dispersed with each other between the first transparent electrode substrate and the second transparent electrode substrate. In this embodiment, the first transparent electrode substrate and the second transparent electrode substrate may have a lap of plastic frame disposed therebetween to form a liquid crystal box.

Step S103: applying different operating voltages between the first transparent electrode substrate and the second transparent electrode substrate at least two times to change a helical pitch of the cholesteric liquid crystals, performing light irradiation passing through the first transparent electrode substrate or the second transparent electrode substrate on the polymerizable monomer in a corresponding one of different domains after each time of applying one of the different operating voltages to solidify the changed helical pitch of the cholesteric liquid crystals, and making solidified helical pitches of the cholesteric liquid crystal in the different domains to be different from each other.

The cholesteric liquid crystals have a memory effect: when applying a low frequency voltage on some cholesteric liquid crystals in planar texture, the liquid crystals will arise dynamic scattering and become in focal conic texture presenting a milky white like the milk, the focal conic texture would continue to be maintained a period of time such as several days even several years after turning off the voltage; and when applying a high frequency voltage on the liquid crystals in focal conic texture, the liquid crystals will immediately become transparent and retrieve back to be in planar texture, the transparent state also will continue to be maintained after turning off the high frequency voltage. That is, the cholesteric liquid crystals are bi-stable.

The electrodes of the first and second transparent electrode substrates individually are connected to a power supply, and thus can apply a voltage between the first transparent electrode substrate and the second transparent electrode substrate via the power supply. The helical pitch of the cholesteric liquid crystals would change with different operating voltages, one corresponding helical pitch would be obtained after each time of applying an operating voltage. Afterwards, by performing light irradiation on polymerizable monomers in different domains to form a polymer network by polymerization reaction, the cholesteric liquid crystals in each domain do not rotate any more and a solidified helical pitch is obtained. Due to the operating voltages applied to the different domains before performing light irradiation are different, the solidified helical pitches of the cholesteric liquid crystals in the different domains are different from each other correspondingly.

Step S104: applying a recovery voltage between the first transparent electrode substrate and the second transparent electrode substrate to retrieve an optical rotatory property of the cholesteric liquid crystals back to the state of solidifying.

After making the solidified helical pitches of the cholesteric liquid crystals reach to desired value, since the cholesteric liquid crystals have been applied with voltages, the cholesteric liquid crystals are in focal conic texture, light would arise strong scattering when passing through the liquid crystals in focal conic texture. At this time, if applying a recovery voltage between the first transparent electrode substrate and the second transparent electrode substrate, the optical rotatory property of cholesteric liquid crystals can retrieve back to the state of solidifying, i.e., the cholesteric liquid crystals retrieve back to be in planar texture, and incident polarized light would be deflected according to deflections of liquid crystal molecules in different planes.

Since the orientation vector of the cholesteric liquid crystals periodically rotate according to a certain solidified helical pitch, so that polarization states of emitting lights corresponding to different solidified helical pitches are different. In this embodiment, the polarized light modulation device obtained by the manufacturing method of a polarized light modulation device of the present invention has different domains with at least two different solidified helical pitches, after a same polarized light incident into the polarized light modulation device of the present invention, the emitting lights corresponding to the different domains would have different polarization states, by making the polarized lights with different polarization states to be incident onto an alignment layer surface of a liquid crystal panel, the alignment processing on the liquid crystal molecules in the liquid crystal panel is completed. That is, by using the polarized light modulation device of the present invention, only one time exposure is required to complete the alignment of the liquid crystal molecules in the liquid crystal panel, the process is simplified and the production efficiency is improved.

Moreover, the step S103 may further include:

(1) applying a first operating voltage between the first transparent electrode substrate and a second transparent electrode substrate to change the helical pitch of the cholesteric liquid crystals to be a first helical pitch;

(2) performing a first time light irradiation passing through the first transparent electrode substrate or the second transparent electrode substrate on polymerizable monomers in a first domain to make a solidified pitch of the cholesteric liquid crystals in the first domain to be the first helical pitch;

(3) applying a second operating voltage between the first transparent electrode substrate and the second transparent electrode substrate to change the helical pitch of cholesteric liquid crystals to be a second helical pitch, the second helical pitch being not equal to the first helical pitch;

(4) performing a second time light irradiation passing through the first transparent electrode substrate or the second transparent electrode substrate on polymerizable monomers in a second domain to make a solidified pitch of the cholesteric liquid crystals in the second domain to be the second helical pitch, the second domain being different from the first domain, the second operating voltage being different from the first operating voltage, and the second helical pitch being different from the first helical pitch.

In this embodiment, the first domain and the second domain cooperatively constitute all domains between the first transparent electrode substrate and the second transparent electrode substrate. The first domain or the second domain is not necessarily a single domain and can be a combination of multiple discrete domains, i.e., domains with the first helical pitch cooperatively constitute the first domain, and domains with the second helical pitch cooperatively constitute the second domain. In other embodiment, it may be that three or even more domains between the first transparent electrode substrate and the second transparent electrode substrate are applied with different operating voltages and performed with light irradiation, so as to make the different domains to have different solidified pitches. The specific situation is designed according to production requirement and thus will be further listed herein.

When performing the light irradiation passing through the first transparent electrode substrate or the second transparent electrode substrate on the polymerizable monomers in a corresponding one of different domains after applying one of the different operating voltages, the other domain without the need of light irradiation is shaded, for example using a light shielding plate to shade the light, which can prevent light from irradiating the other domain without the need of exposure and a range of the domain needed helical pitch adjustment can be precisely controlled.

Furthermore, before applying different operating voltages between the first transparent electrode substrate and the second transparent electrode substrate by at least two times, the manufacturing method may further include a step of: adding a photoinitiator or a photo sensitizer between the first transparent electrode substrate and the second transparent electrode substrate. The photoinitiator can absorb the energy of a certain wavelength in the ultraviolet or visible region and generates free radicals, cations and so on, so as to cause the polymerizable monomers to cross-link and solidify. In this embodiment, the photoinitiator may be diphenyl-ethanone, aroyl phosphine oxide or diphenylmethanone, and so on. The photo sensitizer can transfer light energy to some reactants being not sensitive to visible light, so as to increase or expand their photographic properties. In this embodiment, the photosensitizer may be benzophenone or benzoin dimethyl ether, and so on. In this embodiment, the added photoinitiator or photosensitizer can improve the reaction efficiency of the polymerizable monomers.

The first transparent electrode substrate and the second transparent electrode substrate each include a glass substrate and a transparent electrode formed on the glass substrate. Each the transparent electrode can be a film deposited on the glass substrate by sputtering. A surface formed with the transparent electrode of the first transparent electrode substrate is oppositely disposed with another surface with the transparent electrode of the second transparent electrode substrate.

In this embodiment, the operating voltages are direct current voltage, and the recovery voltage is an alternating current voltage. The alternating current voltage can change the focal conic texture of the cholesteric liquid crystals caused by the operating voltages to be planar texture.

In an alternative embodiment, the operating voltages are alternating current voltages, and the recovery voltage is an alternating current voltage. A frequency of the recovery voltage is higher than a frequency of each of the operating voltages. The alternating current voltage with higher frequency can change the focal conic texture of the cholesteric liquid crystals caused by each of the alternating current voltages with low frequency to be planar texture.

In this embodiment, a light source used by light irradiation is ultraviolet light. In other embodiment, the light source may be a high or medium pressure mercury lamp or a xenon light source.

Figure 2:
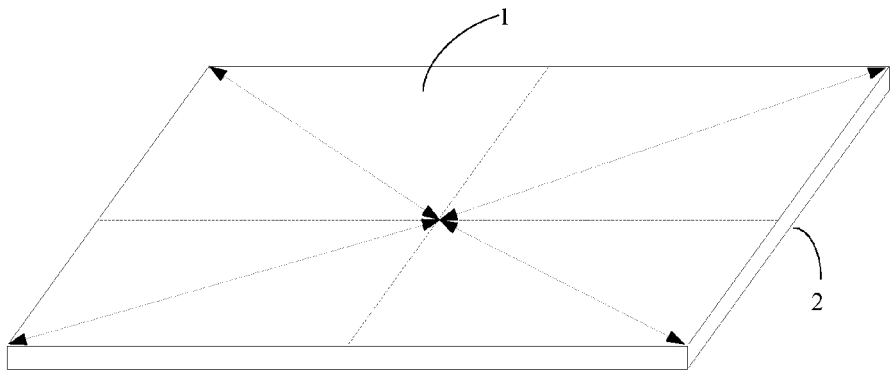
FIG. 2 is a schematic structural view of an exemplary embodiment of a polarized light modulation device according to the present invention.

Referring to FIG. 2, another embodiment of the present invention provides a polarized light modulation device. Dashed lines each with a double-headed arrow in FIG. 2 indicate polarization directions of polarized lights emitted from respective domains. The polarized light modulation device includes a first transparent electrode substrate 1, a second transparent electrode substrate 2 and a polymer dispersed cholesteric liquid crystal layer filled between the first transparent electrode substrate 1 and the second transparent electrode substrate 2. The polarized light modulation device is divided into at least two domains by the first transparent electrode substrate 1 or the second transparent electrode substrate 2, and solidified helical pitches of the cholesteric liquid crystals in the at least two domains respectively are different from each other.

The polymer dispersed cholesteric liquid crystal layer filled between the first transparent electrode substrate 1 and the second transparent electrode substrate 2 is formed by: filling polymerizable monomers and cholesteric liquid crystals between the first transparent electrode substrate 1 and the second transparent electrode substrate 2, applying different operating voltages between the first transparent electrode substrate 1 and the second transparent electrode substrate 2 by at least two times to change a helical pitch of the cholesteric liquid crystals, and performing light irradiation passing through the first transparent electrode substrate 1 or the second transparent electrode substrate 2 on the polymerizable monomers in a corresponding one of different domains after each time of applying one the different operating voltages so as to solidify changed helical pitches of the cholesteric liquid crystals.

The polarized light modulation device in the embodiment of the present invention has different domains with at least two different solidified helical pitches, after a same polarized light incident into the polarized light modulation device, emitting lights corresponding to the different domains have different polarization states, by introducing the emitted polarized lights with these different polarization states to be incident onto an alignment layer surface in a liquid crystal panel, the alignment processing to the liquid crystal molecules in the liquid crystal panel can be completed. That is, by using the polarized light modulation device of the present invention, only one time exposure is required to complete the alignment of liquid crystal molecules, the process is simplified and the production efficiency is improved consequently.

The first transparent electrode substrate 1 and the second transparent electrode substrate 2 each include a glass substrate and a transparent electrode (not shown) formed on the glass substrate. Each the transparent electrode can be a film deposited on the glass substrate by sputtering. Surfaces of the first and second transparent electrode substrates 1, 2 with the transparent electrodes are disposed opposite to each other. In this embodiment, a lap of plastic frame (not shown) may be disposed between the first transparent electrode substrate 1 and the second transparent electrode substrate 2 to form a liquid crystal box.

Moreover, the first transparent electrode substrate 1 and the second transparent electrode substrate 2 may have a photoinitiator or a photosensitizer added therebetween.

In addition, a light source used for the light irradiation is ultraviolet light. In other embodiment, the light source can be high or medium mercury lamp or xenon light source.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of a polarized light modulation device, comprising:

providing oppositely disposed a first transparent electrode substrate and a second transparent electrode substrate;

filling polymerizable monomers and cholesteric liquid crystals between the first transparent electrode substrate and the second transparent electrode substrate;

adding a photoinitiator or a photosensitizer between the first transparent electrode substrate and the second transparent electrode substrate;

applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains to be different from each other;

applying a recovery voltage between the first transparent electrode substrate and the second transparent electrode substrate to retrieve an optical rotatory property of the cholesteric liquid crystals back to the state of solidifying;

wherein when performing the light irradiation passing through the first transparent electrode substrate or the second transparent electrode substrate on the polymerizable monomers in the corresponding one of the different domains after each time of applying one of the different operating voltages, the other of the different domains without the need of light irradiation is shielded from the light irradiation;

wherein the operating voltages are direct current voltages and the recovery voltage is an alternating current voltage; or, the operating voltages are alternating current voltages and the recovery voltage is an alternating current voltage having a frequency higher than a frequency of each of the operating voltages.

2. The manufacturing method as claimed in claim 1, wherein the step of applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified helical pitches of the cholesteric liquid crystals in the different domains be different from each other comprises:
　　applying a first operating voltage between the first transparent electrode substrate and the second transparent electrode substrate to make the helical pitch of the cholesteric liquid crystals change to be a first helical pitch;
　　performing a first time light irradiation passing through the first transparent electrode substrate or the second transparent electrode substrate on the polymerizable monomers in a first domain to make a solidified helical pitch of the cholesteric liquid crystals in the first domain to be the first helical pitch;
　　applying a second operating voltage between the first transparent electrode substrate and the second transparent electrode substrate to make the helical pitch of the cholesteric liquid crystals change to be a second helical pitch, wherein the second helical pitch is not equal to the first helical pitch;
　　performing a second time light irradiation passing through the first transparent electrode substrate or the second transparent electrode substrate on the polymerizable monomers in a second domain to make a solidified helical pitch of the cholesteric liquid crystals in the second domain to be the second helical pitch, wherein the second domain is different from the first domain, the second operating voltage is different from the first operating voltage, and the second helical pitch is different from the first helical pitch.

3. The manufacturing method as claimed in claim 1, wherein the first transparent electrode substrate and the second transparent electrode substrate each comprise a glass substrate and a transparent electrode disposed on the glass substrate.

4. The manufacturing method as claimed in claim 1, wherein a light source used for the light irradiation is ultraviolet light.

5. A manufacturing method of a polarized light modulation device, comprising:
　　providing oppositely disposed a first transparent electrode substrate and a second transparent electrode substrate;
　　filling polymerizable monomers and cholesteric liquid crystals between the first transparent electrode substrate and the second transparent electrode substrate;
　　applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified pitches of the cholesteric liquid crystals in the different domains to be different from each other;
　　applying a recovery voltage between the first transparent electrode substrate and the second transparent electrode substrate to retrieve an optical rotatory property of the cholesteric liquid crystals back to the state of solidifying;
　　wherein the operating voltages are direct current voltages and the recovery voltage is an alternating current voltage; or, the operating voltages are alternating current voltages and the recovery voltage is an alternating current voltage having a frequency higher than a frequency of each of the operating voltages.

6. The manufacturing method as claimed in claim 5, wherein the step of applying different operating voltages between the first transparent electrode substrate and the second transparent electrode substrate by at least two times to change a helical pitch of the cholesteric liquid crystals, performing light irradiation passing through the first transparent electrode substrate or the second transparent electrode substrate on the polymerizable monomers in a corresponding one of different domains after each time of applying one of the different operating voltages to solidify the changed helical pitch of the cholesteric liquid crystals, and making solidified pitches of the cholesteric liquid crystals in the different domains to be different from each other comprises:
　　applying a first operating voltage between the first transparent electrode substrate and the second transparent electrode substrate to change the helical pitch of the cholesteric liquid crystals change to be a first helical pitch;
　　performing a first time light irradiation passing through the first transparent electrode substrate or the second transparent electrode substrate on the polymerizable monomers in a first domain to make a solidified helical pitch of the cholesteric liquid crystals in the first domain to be the first helical pitch;
　　applying a second operating voltage between the first transparent electrode substrate and the second transparent electrode substrate to change the helical pitch of the cholesteric liquid crystals change to be a second helical pitch, wherein the second helical pitch is not equal to the first helical pitch;
　　performing a second time light irradiation passing through the first transparent electrode substrate or the second transparent electrode substrate on the polymerizable monomers in a second domain to make a solidified helical pitch of the cholesteric liquid crystals in the second domain to be the second helical pitch, wherein the second domain is different from the first domain, the second operating voltage is different from the first operating voltage, and the second helical pitch is different from the first helical pitch.

7. The manufacturing method as claimed in claim 5, wherein when performing the light irradiation passing through the first transparent electrode substrate or the second transparent electrode substrate on the polymerizable monomers in the corresponding one of the different domains after each time of applying one of the different operating voltages, the other of the different domains without the need of light irradiation is shielded from the light irradiation.

8. The manufacturing method as claimed in claim 5, before applying different operating voltages between the first transparent electrode substrate and the second transparent electrode substrate by at least two times, further comprising:
　　adding a photoinitiator or a photosensitizer between the first transparent electrode substrate and the second transparent electrode substrate.

9. The manufacturing method as claimed in claim 5, wherein the first transparent electrode substrate and the second transparent electrode substrate each comprise a glass substrate and a transparent electrode disposed on the glass substrate.

10. The manufacturing method as claimed in claim 5, wherein a light source used for the light irradiation is ultraviolet light.

\* \* \* \* \*